United States Patent [19]
Fulbert et al.

[11] Patent Number: 6,014,393
[45] Date of Patent: Jan. 11, 2000

[54] LASER MATERIALS AND MICROLASERS HAVING HIGH ACTIVE ION CONCENTRATIONS, AND PRODUCTION PROCESSES

[75] Inventors: Laurent Fulbert, Voiron; Engin Molva, Grenoble; Bernard Ferrand, Voreppe, all of France

[73] Assignee: Commissariat a l'Energie Atomique, Paris, France

[21] Appl. No.: 08/878,601

[22] Filed: Jun. 19, 1997

[30] Foreign Application Priority Data

Jun. 28, 1996 [FR] France .................... 96 08103

[51] Int. Cl.⁷ ......................................... H01S 3/16
[52] U.S. Cl. ................................ 372/41; 372/40
[58] Field of Search ........................... 372/40, 41

[56] References Cited

U.S. PATENT DOCUMENTS

| | | |
|---|---|---|
| 4,815,079 | 3/1989 | Snitzer et al. ............................ 372/6 |
| 5,394,413 | 2/1995 | Zayhowski . |
| 5,414,724 | 5/1995 | Zhou et al. . |
| 5,495,494 | 2/1996 | Molva et al. . |

FOREIGN PATENT DOCUMENTS 0 653 824    5/1995    European Pat. Off. .

OTHER PUBLICATIONS

Hecht; *The Laser Guidebook*; McGraw–Hill; (no month) 1992; pp. 389–391.

Silfvast; Laser Fundamentals; Cambridge Univeristy Press; (no month) 1996; pp. 149–151.

Applied Physics Letters, vol. 65, No. 13, pp. 1620–1622, Sep. 26, 1994, P. Gavrilovic, et al., "High–Power, Single–Frequency Diode–Pumped ND:YAG Microcavity Lasers at 1.3 μm".

Applied Optics, vol. 34, No. 3, pp. 435–437, Jan. 20, 1995, J. J. Zayhowski, et al., "Tm: $YVO_4$ Microchip Laser".

Proceedings of the Lasers and Electro–Optics Society Annual Meeting, pp. 683–684, J. J. Zayhowski, "Picosecond Q–Switched Microchip Laser", Nov. 1993.

Optics Communications, vol. 115, No. 5–6, pp. 491–497, D. Pelenc, et al., "High Slope Efficiency and Low Threshold in a Diode–Pumped Epitaxially Grown Yb: YAG Waveguide Laser", Apr. 1995.

Jourrnal of Applied Physics, vol. 76, No. 11, Dec. 1, 1994, pp. 7651–7653, D. P. Shepherd, et al., "A Low Threshold, Room Temperature 1.64 μm $Yb:Er:Y_3AL_5O_{12}$ Waveguide Laser".

Optics Letters, vol. 19, No. 8, pp. 554–5566, Apr. 15, 1994, T.Y. Fan, "Aperture Guiding in Quasi–Three–Level Lasers".

Optics Letters, vol. 17, No. 17, pp. 1201–1203, Sep. 1, 1992, J. J. Zayhowski, et al., "Diode–Pumped Microchip Lasers Electro–Optically Q Switched at High Pluse Repetition Rates".

*Primary Examiner*—Rodney Bovernick
*Assistant Examiner*—Robert E. Wise
*Attorney, Agent, or Firm*—Oblon, Spivak, McClelland, Maier & Neustadt, P.C.

[57] ABSTRACT

The invention relates to an active laser material having a base material doped with active ions, giving said base material laser properties, the ion concentration being equal to or higher than 2%.

The invention also relates to a microlaser produced with such a material, as well as a process for producing such a material. The microlaser incorporates an active medium (6) produced by epitaxial growth on a substrate (8), the latter then being removable, as well as microlaser cavity mirrors (2, 4). A pumping beam (10) makes it possible to optically pump the cavity.

24 Claims, 4 Drawing Sheets

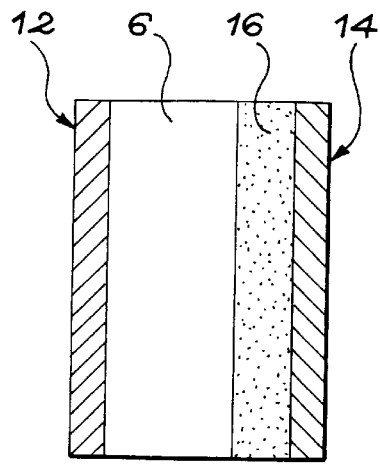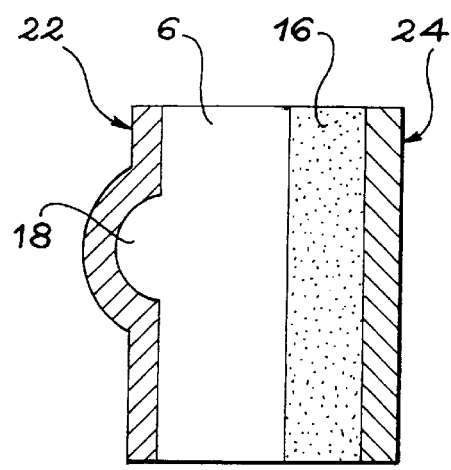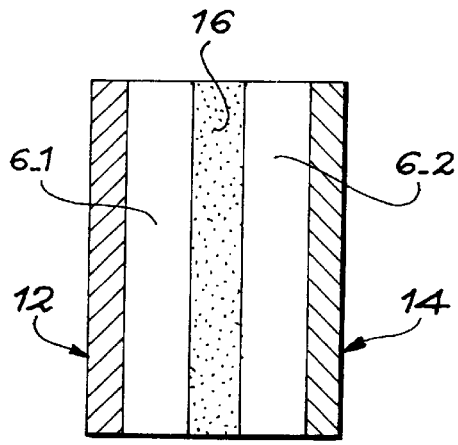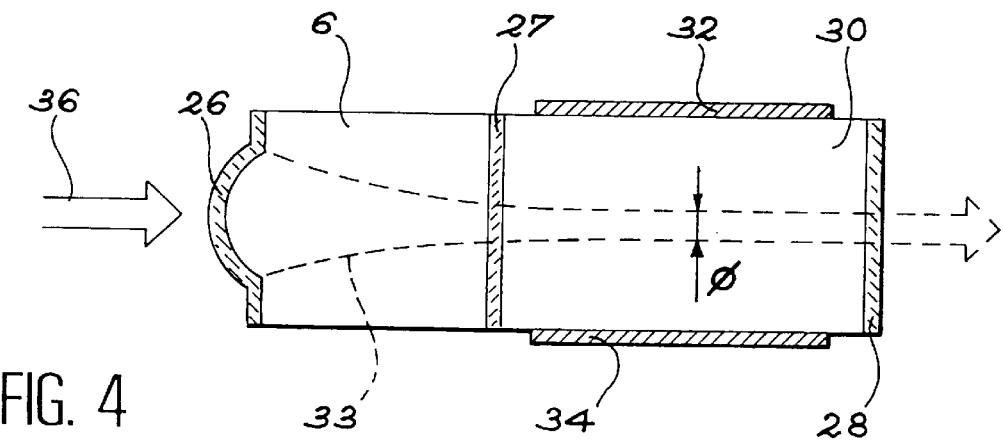

LASER MATERIALS AND MICROLASERS HAVING HIGH ACTIVE ION CONCENTRATIONS, AND PRODUCTION PROCESSES

DESCRIPTION

Technical Field and Prior Art

The invention relates to the field of materials used as active materials in solid lasers. Such materials have a base medium doped with ions giving said medium laser properties.

The invention also relates to the field of microlasers or microlaser cavities, whereof the active medium is solid. The structure of a microlaser is a stack of multilayers.

The active laser medium is constituted by a material of limited thickness (between 150 and 1000 $\mu$m) and of small size (a few mm$^2$) on which are directly deposited dielectric cavity mirrors. This active medium can be pumped by a III–V laser diode, which is either directly hybridized on the microlaser or coupled to the latter by an optical fibre. The possibility of mass production using micro-electronic means allows a mass production of such microlasers at low cost.

Microlasers have numerous applications in fields as varied as cars, the environment, scientific instrumentation and telemetry.

Solid laser materials, particularly those intended for microlasers usually have a base structure doped with active ions. A known procedure for producing such active media or laser materials is the Czochralski crystal growth method. This is particularly the case for the laser material YAG doped with neodymium (YAG:Nd$^{3+}$).

In general terms, the doping of the base material with active ions takes place at a concentration not exceeding 1.1 to 1.3%. As a result of physical limitations (segregation problems) of the Czochralski growth method, it is not possible to obtain higher concentrations, particularly in YAG or YLF laser crystals doped with neodymium (Nd).

The article by J. J. Zayhowski et al entitled "Diode-pumped microchip lasers electro-optically Q-switched at high pulse repetition rates" published in Optics Letters, vol. 17, No. 17, pp 1201–1203, Sep. 1, 1992 refers to a doping rate of 1.8% for a YAG:Nd laser, but describes no method making it possible to produce such a laser crystal.

Microlasers are produced from substrates of large size, solid laser materials. However, the substrates used have limits, referred to hereinbefore, with regards to their concentration. This leads to a low absorption coefficient at the wavelength of the optical pumping beam of the laser material.

In particular, the ratio between the absorbed power and the incident power is given by $\eta=1-e^{-\alpha L}$, in which $\alpha$ is the absorption coefficient and L the microlaser length. The value of the absorption coefficient is typically 3.5 cm$^{-1}$. The absorption length (length at the end of which 63% of the pumping beam is absorbed and equal to the inverse of the absorption coefficient) is 2.8 mm. For example, for a microlaser of thickness 500 $\mu$m, which is often obtained when it is wished to have a longitudinal monomode microlaser, the absorbed pumping power in the microlaser during the passage of the pumping beam only represents 16% of the incident power. The remainder is not absorbed and consequently not useful for the laser effect.

As stated hereinbefore, it is not possible to increase the doping ion concentration as a result of the growth procedure used.

One solution to this problem could consist of increasing the microlaser length. For example, on passing from 500 $\mu$m to 2.8 mm, which is the absorption length, the absorbed power for a YAG:Nd microlaser increases from 16 to 63%. However, a 2.8 mm long, YAG:Nd microlaser no longer has a monomode operation, because several Fabry-Pérot modes of the cavity are within the gain band of the material. Moreover, a 2.8 mm laser cavity can no longer really be considered as a microlaser cavity and may be unstable in a planar-planar cavity configuration.

Therefore the solution consisting of increasing the laser medium length is not satisfactory.

In the case of microlasers, particularly with the active medium YAG or YLF and doped with neodymium, the aim is to simultaneously obtain a monofrequency operation and an improved pumping efficiency (the absorption of the pumping beam is proportional to the dopant concentration). On considering the example of YAG:Nd microlasers passively switched by saturable absorber, particularly by YAG:Cr$^{4+}$, the aim is to lower the laser thresholds to e.g. around 100 mW.

DESCRIPTION OF THE INVENTION

Thus, the invention proposes a method making it possible to obtain active laser materials with a high active ion doping.

Moreover, with a view to applications in the manufacture of microlaser, this method must be compatible with microlaser mass production processes.

More specifically, the invention relates to a process for producing an active laser material having a growth stage by liquid phase epitaxy of a base material in which the active ions giving it laser properties are introduced so as to obtain an active ion concentration equal to or above 2%.

The invention also relates to a process for producing an active laser material involving a liquid phase epitaxy growth stage of a base material in which active ions giving it laser properties are introduced so as to obtain active ion concentrations between 2 and 12%.

The invention more specifically relates to a process for producing an active laser material having a liquid phase epitaxy growth stage for a YAG base material doped with neodymium (Nd$^{3+}$) ions with a concentration of 12%.

Liquid phase epitaxy makes it possible to increase the concentration of active ions in the crystal. The absorption coefficient of the laser medium is increased to the same extent. It is then possible to produce high yield, active laser media with a low threshold and even with limited thicknesses. Therefore this process is of particular interest for producing microlasers, especially monomode microlasers. Finally, liquid phase epitaxy is compatible with microlaser mass production processes using microelectronic methods.

The invention also relates to a process for producing a component for a microlaser involving the production of an active laser material by liquid phase epitaxy growth of a base material, in which active ions giving it laser properties are introduced so as to obtain an active ion concentration above 2% and producing a saturable absorber thin layer or film directly on the previously prepared active laser material.

The stages of depositing the laser material and saturable absorber can be repeated in order to finally have alternating layers of laser material and saturable absorber. It is thus possible to choose the location where the saturatable absorber will be positioned in the cavity. This makes it possible to achieve mode selection, particularly when the saturable absorber is in the centre of the cavity.

This gives the essential element of a passively switched microlaser cavity and having, as a result of an active ion concentration above 2%, a low threshold, high yield, active laser medium.

In a particularly advantageous manner, the saturable absorber film can be produced by liquid phase epitaxy. Thus, the two components of the microlaser, namely the active laser medium and the saturable absorber, are both produced by the same method, which is itself compatible with the mass production procedures used in microlaser production.

The invention also relates to an active laser material incorporating a base material doped with active ions, giving said base material laser properties, the active ion concentration being equal to or above 2%. This concentration can in particular be between 2 and 12%.

In the case of a YAG:Nd$^{3+}$ material (or neodymium-doped YLF), the concentration can be between 2 and 15%, e.g. equal to or substantially equal to 12%.

The invention also relates to a microlaser cavity having an input mirror, an output mirror and an active laser medium formed from an active laser material, in the manner described hereinbefore.

As stated hereinbefore, the active laser material is obtained by liquid phase epitaxy. Epitaxy takes place on a substrate having a crystal structure close to or identical to that of the base material of the active laser medium. Thus, the microlaser cavity can itself have the substrate on which the epitaxy of the active laser medium has taken place. This substrate may also have been eliminated.

It is finally possible to add to the active laser medium active or passive cavity switching means.

In the case of passive switching means, a particularly interesting embodiment consists of a saturable absorber depositable by liquid phase epitaxy directly on the active medium.

The passive switching means can have a saturable absorber film with a thickness below 400 or 500 µm.

These characteristics make it possible to obtain intracavity saturable absorbers compatible with the normally used microlaser sizes.

BRIEF DESCRIPTION OF THE DRAWINGS

The features and advantages of the invention can be better gathered from the following non-limitative description with reference to the attached drawings, wherein show:

FIG. 3A A microlaser cavity according to the invention with a saturable absorber and intracavity.

FIG. 3B A microlaser cavity according to the invention with a microlens for stabilizing the cavity.

FIG. 3C A microlaser cavity according to the invention with a saturable absorber in the centre of the cavity.

FIG. 4 An example of a microlaser structure according to the invention with active switching.

DETAILED DESCRIPTION OF EMBODIMENTS OF THE INVENTION

Figure 1:
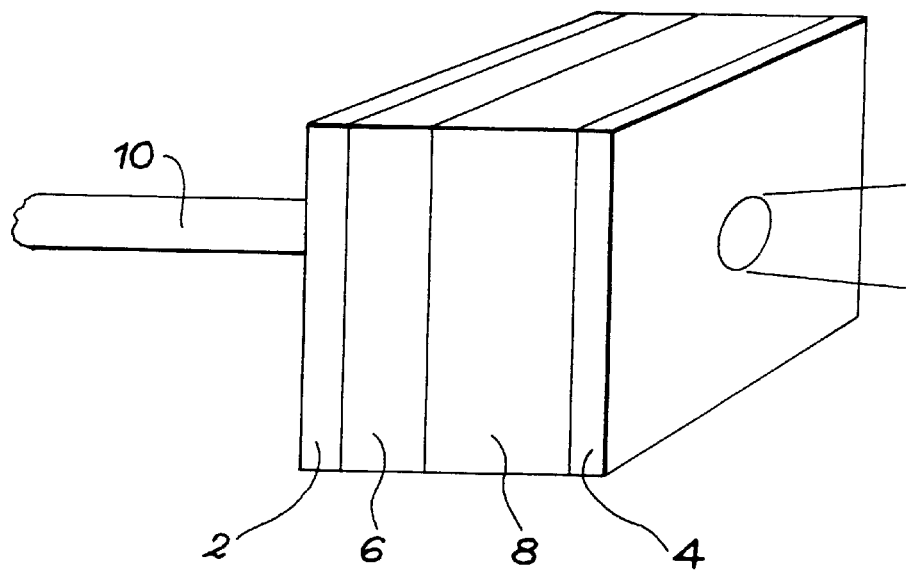
FIGS. 1 and 2 Microlaser cavity structures according to the invention.

A first example of a microlaser structure according to the invention is illustrated by FIG. 1. This structure has two input and output mirrors 2, 4 of the microlaser cavity, as well as a highly doped, active laser medium 6 with an active ion concentration above 1.5 or 2% (wt. %). In the case where the active laser medium 6 is obtained by liquid phase epitaxy growth on an epitaxy substrate, the microlaser cavity also has an intracavity epitaxy substrate 8. The substrate 8 of the active laser medium 6 only differs through the different dopants affecting the optical properties of the active laser medium 6.

Figure 2:
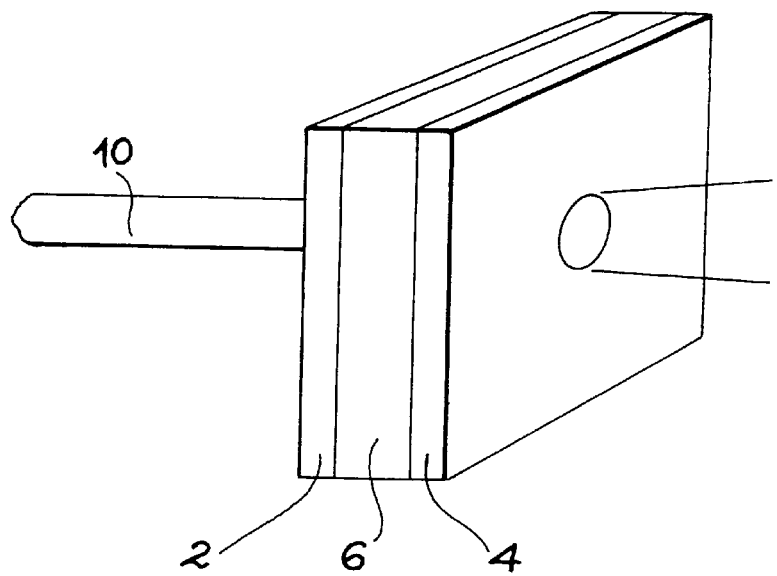
Figure 5A:
FIGS. 5A to 5E Stages in the production of a microlaser according to the invention.
Figure 5B:
Figure 5C:
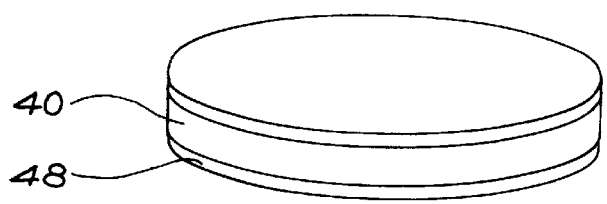
Figure 5D:
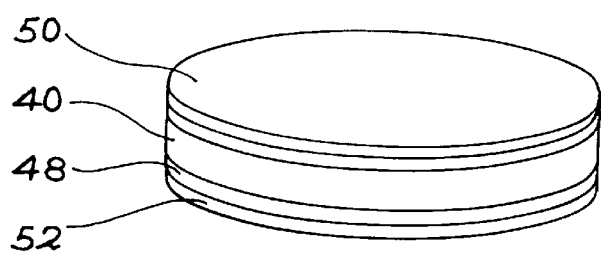
Figure 5E:
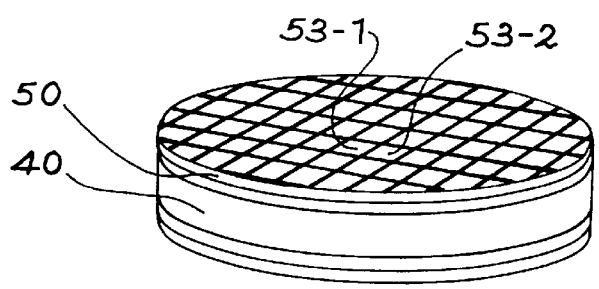

It is also possible to eliminate the substrate 8, following epitaxy, e.g. by a polishing stage. In this case, the microlaser structure illustrated in FIG. 2 is obtained. The microlaser solely has input 2 and output 4 mirrors of the cavity, as well as the highly doped, active laser medium 6.

In FIGS. 1 and 2, reference 10 designates a pumping beam, e.g. a beam of a pumping diode, of the III–V laser diode type.

The active laser material essentially consists of a base material doped with active laser ions.

The base crystalline material can be chosen from among the following: YAG ($Y_3Al_5O_{12}$), $YVO_4$, YSO ($Y_2SiO_5$), YLF ($YLiF_4$) or $GDVO_4$, etc. Choice criteria for one or other of these materials are given in EP-653 824 (U.S. Pat. No. 5,495,494). This document also gives information concerning the choice of the thickness e of the active laser medium, particularly for obtaining a monomode laser, the typical active medium thickness being approximately 750 µm for a YAG active medium and 500 µm for a $YVO_4$ active medium.

With regards to the doping ions a choice is generally made of neodymium (Nd) for a laser emission around 1.06 µm. It is also possible to chose erbium (Er) or an erbium-ytterbium (Er+Yb) codoping for an emission around 1.5 µm. For an emission around 2 µm a choice is made of thulium (Tm), holmium (Ho) or a few thulium-holmium codoping. Doping with ytterbium only leads to an emission at 1.03 µm.

FIGS. 3A to 3C are sectional views of microlaser cavities which can be used within the scope of the present invention, i.e. with a solid laser material doped at a concentration exceeding 1.5 or 2%. In the three cases shown, the epitaxy substrate 8 has been eliminated by polishing. Thus, what remains is the highly doped active laser medium 6, 6-1, 6-2, the input mirrors 12, 22 and output mirrors 14, 24 of the cavity. Another element is present within the microlaser cavity, namely a saturable absorber element 16. In a particularly advantageous manner, the saturable absorber can be a saturable absorber material film directly deposited on the active solid medium 6. To the extent that the latter is produced by liquid phase epitaxy, a particularly interesting performance process for said absorber film is liquid phase epitaxy. In this case, the film 16 is formed from a base material, identical to that of the active solid material 6 and is doped with ions giving it saturable absorber properties, e.g. chromium ($Cr^{4+}$) or erbium ($Er^{3+}$) ions. It is thus possible to obtain a saturable absorber film directly deposited on the above laser medium and with a maximum thickness of 400 um. All the information necessary for producing such a saturable absorber film are given in EP-653 824 (U.S. Pat. No. 5,495,494). It is also possible to make a saturable absorber deposit on either side of the active laser medium 6 and obtain a microlaser cavity with two saturable absorber material films directly deposited on the active laser medium. It is also possible to produce microlenses 18 of a transparent material (e.g. silica) on the surface of the active laser material 6. Here again, all the information necessary for producing the microlenses are given in EP-653

824. The microlenses make it possible to stabilize the microlaser cavity.

The structures of FIGS. 3A to 3C can also be produced with an intracavity substrate 8. This substrate is compatible with a deposition of saturable absorber 16 by liquid phase epitaxy.

In the case of FIG. 3C, the positioning of the saturable absorber in the centre of the cavity facilitates the selection of cavity modes.

The active laser material of a microlaser cavity can also be associated with active switching means located within the cavity. This embodiment is illustrated in FIG. 4, where the reference 6 still designates the highly doped, active laser medium and where the cavity is limited by input 26 and output 28 mirrors of the active laser medium. Thus, an intermediate mirror 27 defines two cavities, a first resonant cavity being constituted by the active laser medium and a second resonant cavity by a material 30 having an index liable to vary as a function of external disturbances. This material 30 can be an electrooptical material, such as $LiTaO_3$, to which a potential difference is applied with the aid of two contact electrodes 32, 34. A pumping beam 36 is directed onto the input mirror 26. The concave mirror 26 reduces the size of the laser beam in the electrooptical medium 30. The conditions relative to the radius of curvature of said mirror and the process for producing the structure of FIG. 4 are given in FR-95 00767 (U.S. Ser. No. 08/587,477).

FIGS. 5A to 5E illustrate stages in the performance of a process for producing a microlaser according to the invention.

In a first stage (FIG. 5A), a two-face, polished laser material substrate 40, which may or may not be doped with active ions, is selected. As a result of the special nature of the liquid phase epitaxy procedure, said substrate is preferably constituted by a material identical to the base material of the active laser medium which it is wished to produce. Thus, if the latter is of the $YAG:Nd^{3+}$ type, a YAG substrate is chosen.

Then, in a second stage (FIG. 5B), liquid phase epitaxy takes place to the laser material 46 with high doping. This makes it possible to obtain active ion concentrations above 1.5 or 2%, e.g. between 1.5 and 15 or 2 and 15% (wt. %). More particularly, in the case of YAG:Nd, it is possible to obtain neodymium concentrations up to 15% (e.g. 12%). Experiments performed in the laboratory have shown that it was possible to increase by a factor of 5 the YLF:Nd absorption coefficient by making it grow by liquid phase epitaxy. This corresponds to a neodymium concentration of approximately 5%. As in the preceding case, Nd concentrations between 2 and 15% can be obtained. All these values are well above the concentrations usually obtained by Czochralski pulling. The thickness of the active medium 46 obtained can be easily controlled, e.g. so as to obtain a monomode microlaser cavity. Information concerning the thicknesses of the active material or the microlaser cavity for producing a monomode cavity is given in EP-653 824. The active medium obtained then undergoes a polishing operation.

Liquid phase epitaxy is a growth procedure in solution. In addition, during the growth of a substituted crystal, it is the solubility of the different species in the solution which acts on the concentration of the substitutions in the crystal.

When using a conventional procedure of the molten bath type, the segregation coefficient is very low and it is not possible to obtain highly concentrated crystals, especially with neodymium. It is therefore necessary to place a large amount of neodymium in a bath in order to obtain a very weakly doped crystal (approximately 1.3%) and beyond a certain limit parasitic phases appear.

In the case of liquid phase epitaxy two limitations are encountered, namely the formation of parasitic phases more stable than the crystal. When substitution takes place of the cations in a crystal, e.g. chromium, vanadium or cobalt cations in aluminates, silicates of rare earths it is found that on increasing the concentration of a substituent, parasitic phases appear such as a vanadate of rare earths or lead chromate (in the case of baths based on the solvent PbO). Moreover, in liquid phase epitaxy, a second problem occurs with the film-substrate lattice agreement. Thus, the substitution of one cation by a much larger cation increases the crystal lattice of the film, which passes into compression. In this case, a complimentary substitution takes place by a small inactive cation, whose concentration and quantity can be calculated compared with those of the substituent by applying Vegard's law.

Thus, in the case of neodymium-doped YAG ($Y_3Al_5O_{12}$), by liquid phase epitaxy it is possible to increase the highly neodymium concentrated films up to 15%. The lattice parameter then becomes too high and it is readjusted by adding a small inactive rare earth such as lutetium (from 4 to 5% neodymium). Thus, YAG:Nd monocrystalline laser films with concentrations well above those of solid crystals have been produced by liquid phase epitaxy. In the case of $Cr^{4+}$-doped YAG, it has been possible to produce by epitaxy films with absorptions up to 1.06 $\mu$m of several dozen $cm^{-1}$ in order to obtain a saturable absorber (in solid crystals generally only a few $cm^{-1}$ absorption are obtained). These films are also in high compression and a substitution of yttrium by lutetium readjusts the lattice agreement. In this case, the maximum $Cr^{4+}$ concentration is limited by the appearance of parasitic phases of the $PbCr_5O_8$ or $MgAl_2O_4$ type.

In a third stage (FIG. 5C), it is possible to deposit a saturable absorber material film 48. This deposition can take place by liquid phase epitaxy, the material 48 then being constituted by a base material, identical to that of the film 40 and doped with ions giving it saturable absorber properties.

The second and third stages can be repeated in order to obtain an alternation of laser material and saturable absorber films. Thus, it is possible to obtain a structure as illustrated in FIG. 3C, where the saturable absorber 16 is placed between two laser material films 6-1 and 6-2.

The following stage (FIG. 5D) consists of producing deposits of input and output mirrors 50, 52 on either side of the element obtained during the preceding stage. They are generally dichroic mirrors obtained by a deposition of dielectric multilayers, as is known and commercially available.

The structure of multilayers obtained (FIG. 5E) is then cut to obtain microlaser chips. This cutting can take place with a diamond saw (of the type used in microelectronics for silicon chip cutting). It is therefore possible to obtain laser chips 53-1, 53-2, etc. and a cross-section of a few $mm^2$.

As described hereinbefore, there can be a supplementary stage in the case where it is wished to produce on one or other of the faces of the structure obtained a microlens system. Preferably, the microlenses are directly etched on the laser material using standard microelectronics methods.

During the polishing performed after liquid phase epitaxy of the laser material, it is possible to eliminate the substrate 40 on which epitaxy has taken place. Thus, all that is retained is a highly doped, epitaxied film.

In all cases, at no time does the structure obtained require an optical alignment of the different components. In addition, no optical glue or adhesive is introduced.

The pumping of the cavity is preferably an optical pumping. Thus, the III–V laser diodes are particularly suitable for pumping a microlaser cavity.

Figure 6A:
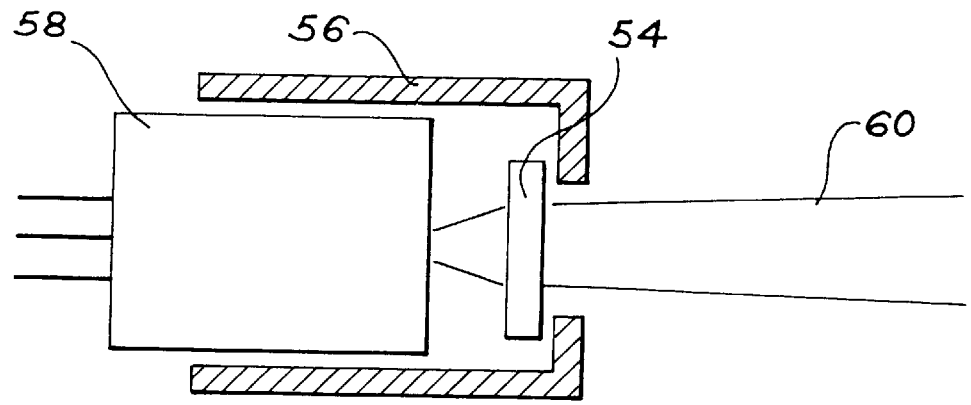
FIGS. 6A & 6B A microlaser according to the invention with optical pumping means and the support box or boxes for the various components.
Figure 6B:
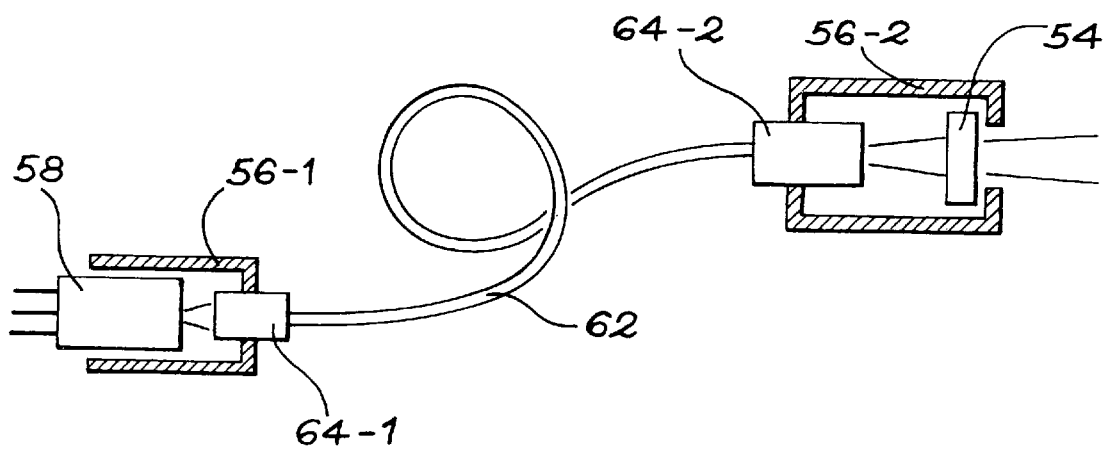

As illustrated in FIG. 6A, a microlaser cavity 54 obtained in the manner described hereinbefore can be placed in a mechanical box 56 also intended to receive the laser pumping diode 58. Reference 60 designates the continuous or pulse-type laser beam obtained. According to another embodiment (FIG. 6B), it is also possible to have two separate boxes 56-1 and 56-2, one for receiving the microlaser cavity 54 and the other for receiving the laser pumping diode 58, the two boxes being connected by an optical fibre 68, with the aid of connectors 64-1 and 64-2 provided in each of the boxes.

The procedure for producing a laser material and microlasers according to the invention makes it possible to obtain high active ion concentrations in a crystal substrate, said concentrations exceeding 1.5 or 2%. For example, concentrations substantially equal to or equal to 3, 4, 5, 8, 9, 10 and 11% are obtained. However, it is not necessarily of interest to increase the concentration to values exceeding 12 or 13%.

Thus, on considering the differential efficiency of the microlaser (i.e. the gradient of the curve giving the power of the laser beam obtained as a function of the power of the incident pumping beam), the latter is directly proportional to the absorption rate $\eta = 1 - e^{-\alpha L}$, in which L is the length of the laser absorbing medium and $\alpha$ the absorption coefficient. On considering said equation, it is clear that it is of interest to choose the highest possible concentration.

However, when the concentration is very high, the luminescence quenching effects reduce the life of the high level of the active ion participating in the laser effect. However, the threshold of the laser, i.e. the absorbed power from which the laser effect occurs, is inversely proportional to the life. Consequently, on reasoning in terms of incident power, the threshold $P_s$ is given by the following relation:

$$P_s = k \frac{1}{\tau(1 - e^{-\alpha L})}$$

in which $\tau$, $\alpha$ and L have the meanings given hereinbefore and k is a proportionality constant.

For a microlaser thickness below 1 mm, calculations show that the minimum threshold is obtained for a concentration between 2 and 3%, which cannot be obtained by the conventional Czochralski growth method.

For a given pumping power, the maximum laser power is obtained for a concentration between 3 and 12%. The 3% concentration gives the lowest threshold, whereas the 12% concentration gives the best differential efficiency.

Particularly in the case of a YAG:Nd laser, it is possible to obtain neodymium concentrations up to 12%. Moreover, experiments performed in the laboratory, have shown that it was possible to increase by a factor of 5 the absorption coefficient of the neodymium-doped YLF by growing the crystal structure by liquid phase epitaxy. This corresponds to a neodymium concentration of about 5%, which is well above the 1% concentration normally achieved by Czochralski pulling.

We claim:

1. Liquid phase epitaxy grown active laser material comprising a crystalline material selected from the group consisting of YAG and YLiF$_4$, said crystalline material having a neodymium (Nd$^{3+}$) ions doping concentration between 2 and 15%.

2. Liquid phase epitaxy grown active laser material according to claim 1, wherein the neodymium (Nd$^{3+}$) doping concentration is greater than 5 and less than or equal to 15%.

3. Microlaser cavity comprising an input mirror, an output mirror and a liquid phase epitaxy grown active laser medium incorporating a YAG crystalline material having a neodymium (Nd$^{3+}$) ions doping concentration between 2 and 15%.

4. Microlaser cavity comprising an input mirror, an output mirror and a liquid phase epitaxy grown active laser medium having a crystalline material YLiF$_4$ including a neodymium ions doping concentration between 2 and 15%.

5. Microlaser cavity according to one of the claims 3 or 4, wherein the neodymium ion doping concentration is greater than 5 and less than or equal to 15%.

6. Microlaser cavity according to one of the claims 3 or 4, further comprising a substrate on which it is possible to carry out epitaxy of the active laser medium.

7. Microlaser cavity according to one of the claims 3 or 4, further comprising passive cavity switching means.

8. Microlaser cavity according to claim 7, wherein the passive switching means has a saturable absorber depositable by liquid phase epitaxy in a direct manner, either on the liquid phase epitaxy grown active laser medium, or on a substrate on which the liquid phase epitaxy grown active laser medium is epitaxied.

9. Microlaser cavity according to claim 8 further comprising alternating layers of the liquid phase epitaxy grown active laser material and the saturable absorber.

10. Microlaser cavity according to claim 9, further comprising a first liquid phase epitaxy grown active laser medium layer, a saturable absorber layer, a second liquid phase epitaxy grown active laser medium layer, the saturable absorber layer being located in the centre or substantially in the centre of the microlaser cavity.

11. Microlaser cavity according to claim 7, wherein the passive switching means incorporates a saturable absorber film having a thickness less than 400 $\mu$m.

12. Microlaser cavity according to one of the claims 3 or 4, further comprising an active microlaser switching means.

13. Microlaser cavity according to one of the claims 3 or 4, wherein the cavity is stabilized.

14. Microlaser cavity according to one of the claims 3 or 4, wherein the cavity is monomode.

15. Microlaser cavity according to one of the claims 3 or 4, wherein the active laser medium has a thickness less than 1 mm.

16. Microlaser cavity according to claim 15, wherein the active laser medium has a thickness less than 500 $\mu$m.

17. Microlaser cavity according to one of the claims 3 or 4, further comprising a cavity pumping means.

18. Process for producing an active laser material, comprising:

growing by liquid phase epitaxy a YAG or YLiF$_4$-based crystalline material, and doping the crystalline material with neodymium (Nd$^{3+}$) ions at a concentration between 2 and 15%.

19. Process according to claim 18, wherein the doping step is performed so that the neodymium ion concentration is greater than 5 and less than or equal to 15%.

20. Process for producing an active laser material according to one of the claims 18 or 19, wherein the step of growing by liquid phase epitaxy takes place on a substrate incorporating a material identical to the base crystalline material of the active laser medium.

21. Process for producing an active laser material according to claim 20, further comprising eliminating the substrate on which the step of growing by liquid phase epitaxy takes place.

22. Process for producing a component for a microlaser cavity comprising:

growing by liquid phase epitaxy an active laser material including YAG or YLiF$_4$-based crystalline material, doping said active laser material with neodymium (Nd$^{3+}$) ions at a concentration between 2 and 15%, and growing a saturable absorber film directly on the previously grown active laser material.

23. Process according to claim 22, wherein the step of growing the saturable absorber film is performed by liquid phase epitaxy.

24. Process according to one of the claims 22 or 23, further comprising repeating alternatively the steps of growing the active laser material and the saturable absorber.

* * * * *